US012259552B2

(12) United States Patent
Adema et al.

(10) Patent No.: US 12,259,552 B2
(45) Date of Patent: Mar. 25, 2025

(54) SPATIAL VARIANCE ALONG WAVEGUIDE INCOUPLER

(71) Applicant: GOOGLE LLC, Mountain View, CA (US)

(72) Inventors: Daniel Adema, Kitchener (CA); Timothy Paul Bodiya, Toronto (CA); Shreyas Potnis, Kitchener (CA)

(73) Assignee: GOOGLE LLC, Mountain View, CA (US)

( * ) Notice: Subject to any disclaimer, the term of this patent is extended or adjusted under 35 U.S.C. 154(b) by 243 days.

(21) Appl. No.: 17/552,721

(22) Filed: Dec. 16, 2021

(65) Prior Publication Data

US 2022/0197035 A1 Jun. 23, 2022

Related U.S. Application Data

(60) Provisional application No. 63/126,624, filed on Dec. 17, 2020.

(51) Int. Cl.
*G02B 27/01* (2006.01)
*F21V 8/00* (2006.01)

(52) U.S. Cl.
CPC ....... *G02B 27/0172* (2013.01); *G02B 6/0016* (2013.01)

(58) Field of Classification Search
CPC .............. G02B 27/0172; G02B 6/0016; G02B 2027/0174; G02B 2027/0178; G02B 5/1819

See application file for complete search history.

(56) References Cited

U.S. PATENT DOCUMENTS

| | | | | |
|---|---|---|---|---|
| 6,510,263 | B1 * | 1/2003 | Maisenholder .... | G02B 6/12007 385/37 |
| 9,372,347 | B1 * | 6/2016 | Levola ................ | G02B 5/1842 |
| 10,578,876 | B1 * | 3/2020 | Lam ..................... | G02F 1/3544 |
| 11,698,492 | B2 * | 7/2023 | Bablumyan ........ | G02B 27/1006 359/15 |
| 11,754,767 | B1 * | 9/2023 | Soskind .................. | G02B 6/35 359/350 |
| 2004/0156590 | A1 | 8/2004 | Gunn, III et al. | |
| 2016/0231257 | A1 * | 8/2016 | Kostamo ............. | G01N 21/958 |
| 2018/0143438 | A1 * | 5/2018 | Oh ...................... | G02B 27/0172 |
| 2018/0252857 | A1 * | 9/2018 | Glik .................. | G02B 27/0172 |
| 2019/0107723 | A1 * | 4/2019 | Lee ..................... | G02B 6/0016 |

(Continued)

FOREIGN PATENT DOCUMENTS

| | | | | |
|---|---|---|---|---|
| WO | WO-2017134412 A1 * | 8/2017 | ............. | A61B 3/113 |
| WO | WO-2018039278 A1 * | 3/2018 | ......... | G02B 27/0018 |

(Continued)

*Primary Examiner* — Marin Pichler
*Assistant Examiner* — Mary A El-Shammaa

(57) ABSTRACT

A head-mounted display (HMD) system including a lens element supported by a support structure, the lens element having a waveguide with an incoupler configured to receive light from an optical scanner of the HMD. The incoupler is configured with multiple features varying in at least one of height, spacing, angle, or density. The features may be separated into discrete zones along the incoupler such that at least one of height, spacing, angle, or density of the plurality of features is varied over the incoupler and constant within a given zone or the features may be varied continuously across the incoupler.

20 Claims, 5 Drawing Sheets

(56) References Cited

U.S. PATENT DOCUMENTS

| | | | |
|---|---|---|---|
| 2020/0018981 A1 | 1/2020 | Evans et al. | |
| 2020/0142131 A1* | 5/2020 | Waldern et al. | |
| 2020/0192031 A1* | 6/2020 | Evans | G02B 5/1819 |
| 2020/0225480 A1* | 7/2020 | Bodiya | G02B 6/0031 |
| 2020/0225498 A1 | 7/2020 | Potnis et al. | |
| 2020/0271936 A1* | 8/2020 | Leibovici | G03H 1/0244 |
| 2023/0251486 A1* | 8/2023 | He | G02B 6/0016 |
| | | | 345/633 |
| 2023/0288705 A1* | 9/2023 | Wang | G02B 6/005 |
| | | | 359/630 |

FOREIGN PATENT DOCUMENTS

| | | | | |
|---|---|---|---|---|
| WO | WO-2016128031 A1 * | 6/2018 | | G02B 6/0016 |
| WO | WO-2018220270 A1 * | 12/2018 | | B29D 11/00 |
| WO | WO-2018220272 A1 * | 12/2018 | | B21D 37/20 |
| WO | WO-2019068304 A1 * | 4/2019 | | G02B 27/0172 |
| WO | WO-2020160188 A1 * | 8/2020 | | G02B 27/0101 |

* cited by examiner

SPATIAL VARIANCE ALONG WAVEGUIDE INCOUPLER

CROSS-REFERENCE TO RELATED APPLICATIONS

The present application claims priority to U.S. Provisional Patent Application Ser. No. 63/126,624, entitled "SPATIAL VARIANCE ALONG WAVEGUIDE INCOUPLER" and filed on Dec. 17, 2020, the entirety of which is incorporated by reference herein.

BACKGROUND

In a conventional wearable head-mounted display (HMD), light from an image source is coupled into a light guide substrate, generally referred to as a waveguide, by an input optical coupling such as an in-coupling grating (i.e., an "incoupler"), which can be formed on a surface, or multiple surfaces, of the substrate or disposed within the substrate. Once the light beams have been coupled into the waveguide, the light beams are "guided" through the substrate, typically by multiple instances of total internal reflection (TIR), to then be directed out of the waveguide by an output optical coupling (i.e., an "outcoupler"), which can also take the form of an optical grating. The light beams projected from the waveguide overlap at an eye relief distance from the waveguide forming an exit pupil within which a virtual image generated by the image source can be viewed by the user of the HMD.

In some HMDs, the incoupler is an optical grating, which can be produced by physically forming grooves or other surface features on a surface of a waveguide, or volume features within the waveguide substrate. The overall efficiency of a grating depends on various application-specific parameters such as wavelength, polarization, and angle of incidence of the incoming light. The efficiency of a grating is also influenced by the grating design parameters, such as the distance between adjacent grating features, grating width, thickness of the grating region, and the angle the gratings form with the substrate. The quality of the virtual image output from a waveguide of an HMD is determined, at least in part, by the amount of light and the angle of the light that is directed into the waveguide by the incoupler. Thus, it is desirable to maximize the performance of a grating acting as an incoupler in an HMD to maximize the quality of the images projected by the HMD.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Due to size constraints, some HMDs include only one grating incoupler to direct various wavelengths of light from a micro-display into the waveguide. Thus, to accommodate the wide range of wavelengths of light projected from the micro-display, the single incoupler is configured to provide moderate efficiency across the range of wavelengths, or the incoupler is configured to provide maximum efficiency for one specific wavelength at the expense of efficiency for the other wavelengths. Additionally, in a linescan projector system, the horizontal field of view (FOV) angles sweep along the incoupler such that the light encountering the left edge of the incoupler is incident at different angles than the light incident on the incoupler's right edge. Because incouplers are generally configured with grating features that are consistent across the incoupler, all angles of scanned laser light encounter the same grating features when incident on the incoupler, causing variation in the incoupling efficiency along the incoupler. This can lead to non-uniformity in the color and intensity of the images output from the waveguide. The introduction of variations to the incoupler grating features is one technique to achieve a uniform incoupling efficiency across the incoupler in a linescan projector system. Parameters of the incoupler that can be varied (i.e., tuned) include, but are not limited to, feature height, feature spacing, feature angles, and feature density.

FIGS. 1-6 illustrate systems and techniques of providing spatial variance in grating features along a waveguide incoupler of a display system in order to increase the uniformity of the incoupling efficiency or to selectively tune the incoupler efficiency depending on design considerations, as described in greater detail below. While the disclosed systems and techniques are described with respect to an example display system, it will be appreciated that present disclosure is not limited to implementation in this particular display system, but instead may be implemented in any of a variety of display systems using the guidelines provided herein.

Figure 1:
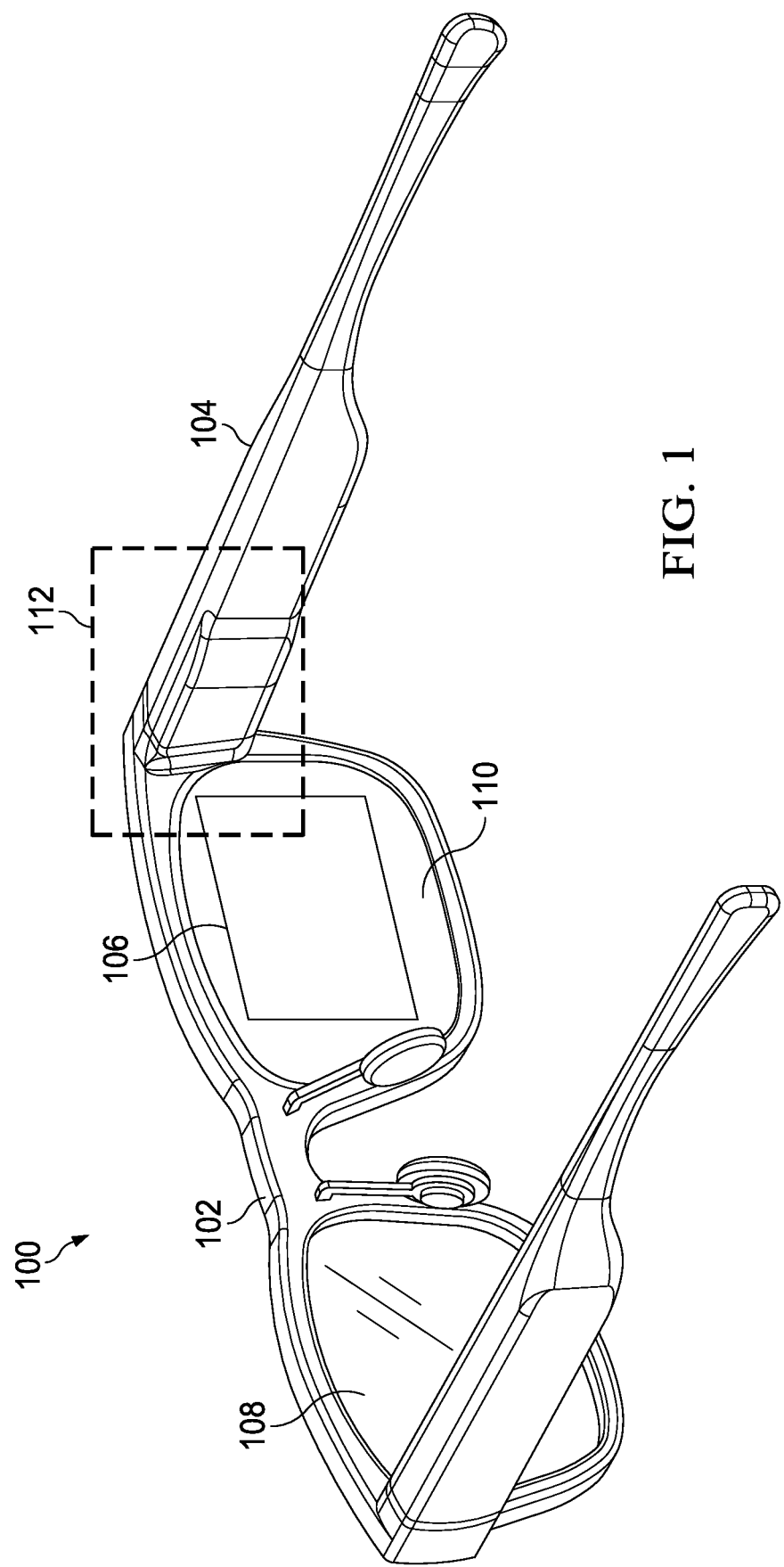
FIG. 1 shows an example display system having a support structure that houses a laser projection system configured to project images toward the eye of a user, in accordance with some embodiments.

FIG. 1 illustrates an example display system 100 having a support structure 102 that includes an arm 104, which houses a laser projection system configured to project images toward the eye of a user, such that the user perceives the projected images as being displayed in a field of view (FOV) area 106 of a display at one or both of lens elements 108, 110. In the depicted embodiment, the display system 100 is a wearable head-mounted display (HMD) that includes a support structure 102 configured to be worn on the head of a user and has a general shape and appearance of an eyeglasses frame. The support structure 102 contains or otherwise includes various components to facilitate the projection of such images toward the eye of the user, such as a laser projector, an optical scanner, and a waveguide. In some embodiments, the support structure 102 further includes various sensors, such as one or more front-facing cameras, rear-facing cameras, other light sensors, motion sensors, accelerometers, and the like. The support structure 102 further can include one or more radio frequency (RF) interfaces or other wireless interfaces, such as a Bluetooth™ interface, a WiFi interface, and the like. Further, in some embodiments, the support structure 102 includes one or more batteries or other portable power sources for supplying power to the electrical components of the display system 100. In some embodiments, some or all of these components of the display system 100 are fully or partially contained within an inner volume of support structure 102, such as within the arm 104 in region 112 of the support structure 102. It should be noted that while an example form factor is depicted, it will be appreciated that in other embodiments the display system 100 may have a different shape and appearance from the eyeglasses frame depicted in FIG. 1.

One or both of the lens elements 108, 110 are used by the display system 100 to provide an augmented reality (AR) or mixed reality (MR) display in which rendered graphical content can be superimposed over or otherwise provided in conjunction with a real-world view as perceived by the user through the lens elements 108, 110. For example, laser light used to form a perceptible image or series of images may be projected by a laser projector of the display system 100 onto the eye of the user via a series of optical elements, such as a waveguide formed at least partially in the corresponding lens element, one or more scan mirrors, and one or more optical relays. One or both of the lens elements 108, 110 thus include at least a portion of a waveguide that routes display light received by an incoupler, or multiple incouplers, of the waveguide to an outcoupler of the waveguide, which outputs the display light toward an eye of a user of the display system 100. The display light is modulated and projected onto the eye of the user such that the user perceives the display light as an image. In addition, each of the lens elements 108, 110 is sufficiently transparent to allow a user to see through the lens elements to provide a field of view of the user's real-world environment such that the image appears superimposed over at least a portion of the real-world environment.

In some embodiments, the projector is a matrix-based projector, a scanning laser projector, or any combination of a modulative light source such as a laser or one or more LEDs and a dynamic reflector mechanism such as one or more dynamic scanners or digital light processors. In some embodiments, the projector includes multiple laser diodes (e.g., a red laser diode, a green laser diode, and/or a blue laser diode) and at least one scan mirror (e.g., two one-dimensional scan mirrors, which may be micro-electromechanical system (MEMS)-based or piezo-based). The projector is communicatively coupled to the controller and a non-transitory processor-readable storage medium or memory storing processor-executable instructions and other data that, when executed by the controller, cause the controller to control the operation of the projector. In some embodiments, the controller controls a scan area size and scan area location for the projector and is communicatively coupled to a processor (not shown) that generates content to be displayed at the display system 100. The projector scans light over a variable area, designated the FOV area 106, of the display system 100. The scan area size corresponds to the size of the FOV area 106 and the scan area location corresponds to a region of one of the lens elements 108, 110 at which the FOV area 106 is visible to the user. Generally, it is desirable for a display to have a wide FOV to accommodate the outcoupling of light across a wide range of angles. Herein, the range of different user eye positions that will be able to see the display is referred to as the eyebox of the display.

In some embodiments, the projector routes light via first and second scan mirrors, an optical relay disposed between the first and second scan mirrors, and a waveguide disposed at the output of the second scan mirror. In some embodiments, at least a portion of an outcoupler of the waveguide may overlap the FOV area 106. These aspects are described in greater detail below.

Figure 2:
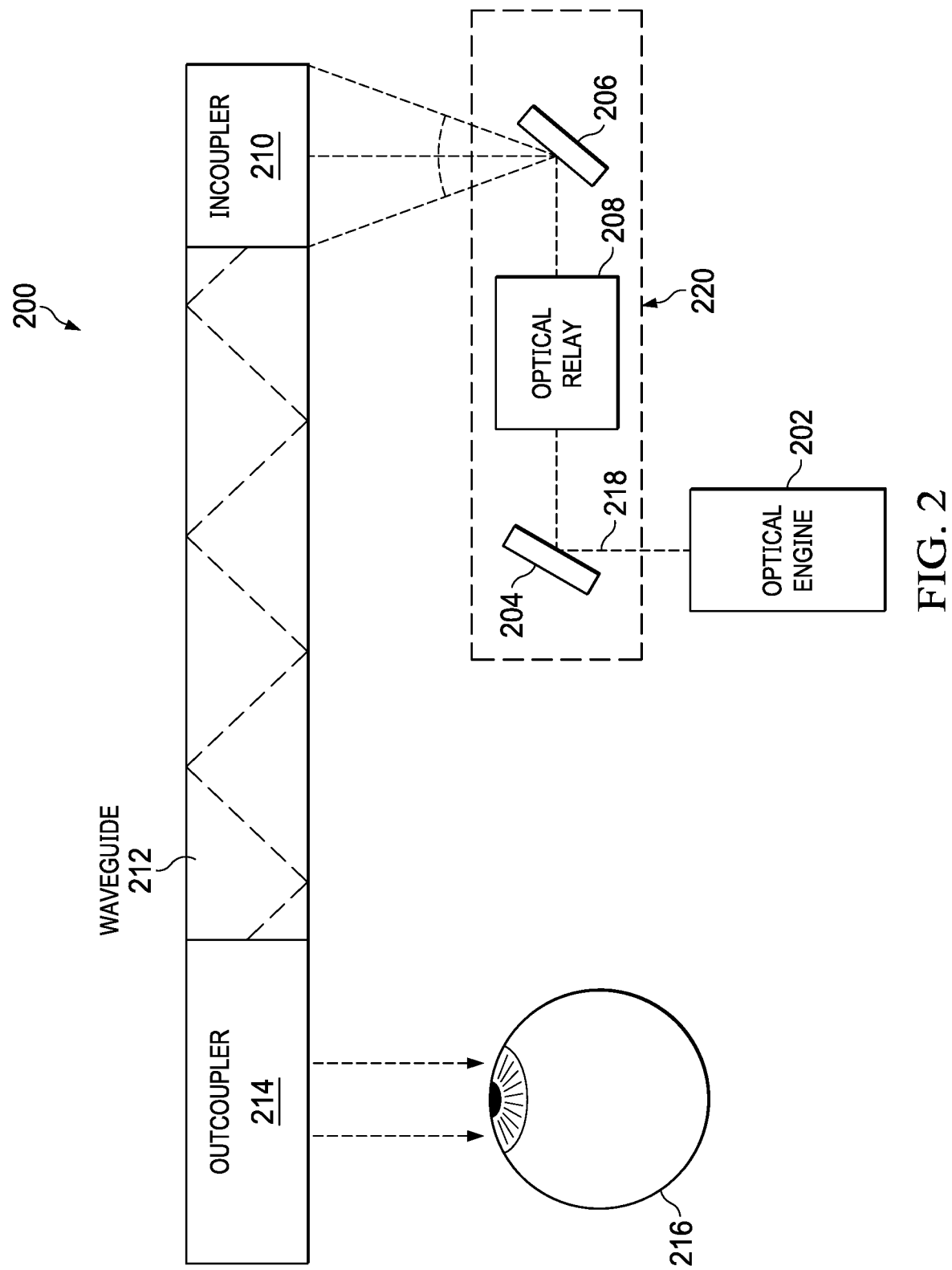
FIG. 2 illustrates a block diagram of a laser projection system that projects laser light representing images onto the eye of a user via a display system, such as the display system of FIG. 1, in accordance with some embodiments.

FIG. 2 illustrates a block diagram of a laser projection system 200 that projects laser light representing images onto the eye 216 of a user via a waveguide, such as that illustrated in FIG. 1. The laser projection system 200 includes an optical engine 202, an optical scanner 220, and a waveguide 212. In some embodiments, the laser projection system 200 is implemented in a wearable heads-up display or other display systems.

The optical engine 202 includes one or more laser light sources configured to generate and output laser light (e.g., visible laser light such as red, blue, and green laser light and/or non-visible laser light such as infrared laser light). In some embodiments, the optical engine 202 is coupled to a controller or driver (not shown), which controls the timing of emission of laser light from the laser light sources of the optical engine 202 (e.g., in accordance with instructions received by the controller or driver from a computer processor coupled thereto) to modulate the laser light 218 to be perceived as images when output to the retina of the eye 216 of the user.

The optical scanner 220 includes a first scan mirror 204, a second scan mirror 206, and an optical relay 208. One or both of the scan mirrors 204 and 206 may be MEMS mirrors, in some embodiments. For example, the scan mirror 204 and the scan mirror 206 are MEMS mirrors that are driven by respective actuation voltages to oscillate during active operation of the laser projection system 200, causing the scan mirrors 204 and 206 to scan the laser light 218. Oscillation of the scan mirror 204 causes laser light 218 output by the optical engine 202 to be scanned through the optical relay 208 and across a surface of the second scan mirror 206. The second scan mirror 206 scans the laser light 218 received from the scan mirror 204 toward an incoupler 210 of the waveguide 212. In some embodiments, the scan mirror 204 oscillates along a first scanning axis, such that the laser light 218 is scanned in only one dimension (i.e., in a line) across the surface of the second scan mirror 206. In some embodiments, the scan mirror 206 oscillates along a second scan axis that is perpendicular to the first scan axis.

The waveguide 212 of the laser projection system 200 includes the incoupler 210 and the outcoupler 214. The term "waveguide," as used herein, will be understood to mean a combiner using total internal reflection (TIR), or via a combination of TIR, specialized filters, and/or reflective surfaces, to transfer light from an incoupler to an outcoupler. For display applications, the light may be a collimated image, and the waveguide transfers and replicates the collimated image to the eye. In general, the terms "incoupler" and "outcoupler" will be understood to refer to any type of optical grating structure, including, but not limited to, diffraction gratings, slanted gratings, blazed gratings, holograms, holographic optical elements (e.g., optical elements using one or more holograms), volume diffraction gratings, volume holograms, surface relief diffraction gratings, and/or surface relief holograms. In some embodiments, a given incoupler or outcoupler is configured as a transmissive diffraction grating that causes the incoupler or outcoupler to transmit light and to apply designed optical function(s) to the light during the transmission. In some embodiments, a given incoupler or outcoupler is a reflective diffraction grating that causes the incoupler or outcoupler to reflect light and to apply designed optical function(s) to the light during the reflection. In the present example, the laser light 218 received at the incoupler 210 is relayed to the outcoupler 214 via the waveguide 212 using TIR. The laser light 218 is then output to the eye 216 of a user via the outcoupler 214.

In some embodiments, incoupler 210 is a substantially rectangular feature configured to receive the laser light 218 and direct the laser light 218 into the waveguide 212. The incoupler 210 may be defined by a small dimension (i.e., width) and a long dimension (i.e., length). In an embodiment, the optical relay 208 is a line-scan optical relay that receives the laser light 218 scanned in a first dimension by the first scan mirror (e.g., the first dimension corresponding to the small dimension of the incoupler 210), routes the laser light 218 to the second scan mirror 206, and introduces a convergence to the laser light 218 in the first dimension. The second scan mirror 206 receives the converging laser light 218 and scans the laser light 218 in a second dimension, the second dimension corresponding to the long dimension of the incoupler 210 of the waveguide 212. The second scan mirror may cause the laser light 218 to converge to a focal line along the second dimension. In some embodiments, the incoupler 210 is positioned at or near the focal line downstream from the second scan mirror 206 such that the second scan mirror 206 scans the laser light 218 as a line over the incoupler 210.

Figure 3:
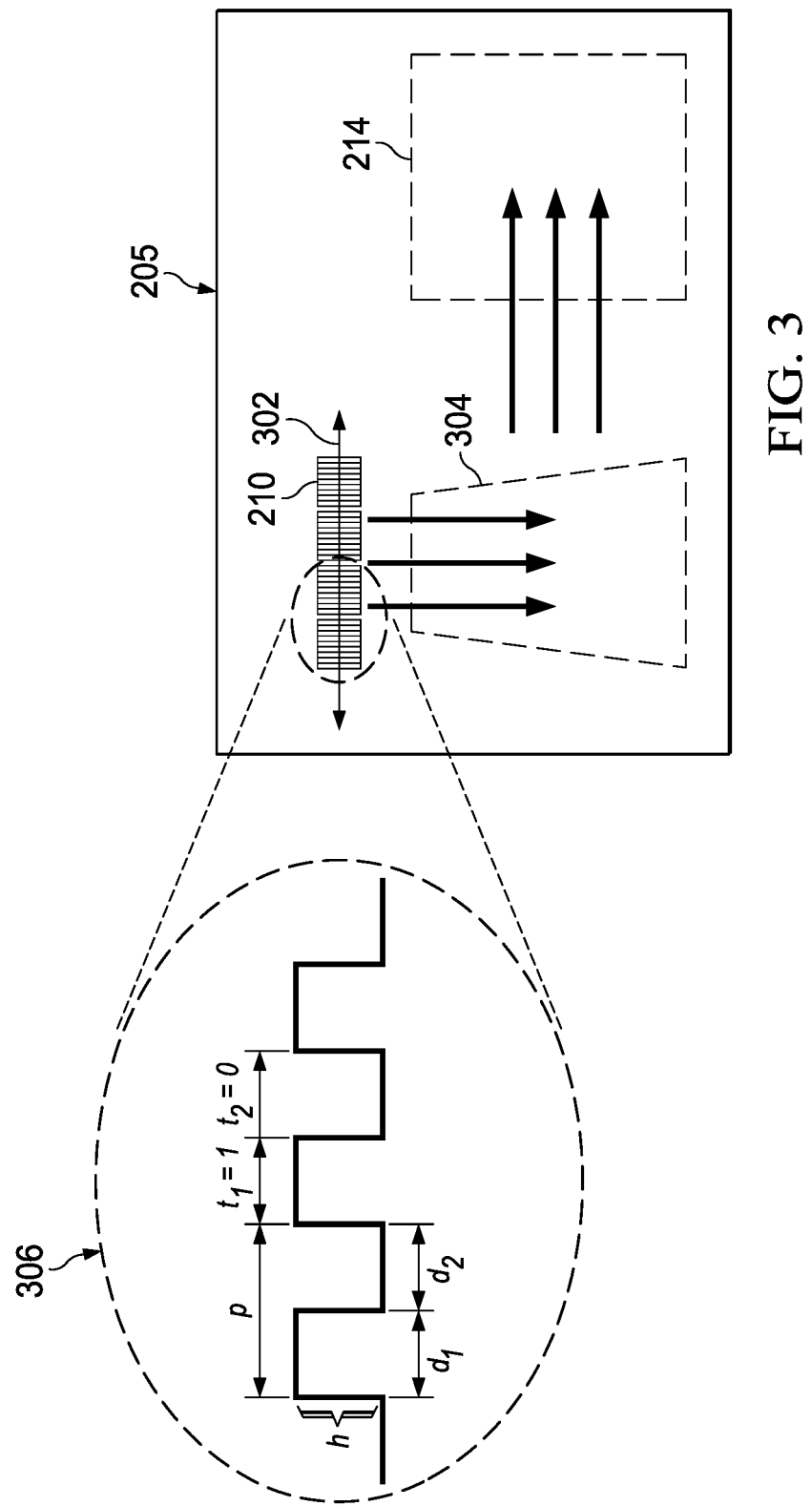
FIG. 3 shows an example of light propagation within a waveguide of a laser projection system, such as the laser projection system of FIG. 2, in accordance with some embodiments.

FIG. 3 shows an example of light propagation within the waveguide 205 of the laser projection system 200 of FIG. 2. As shown, light is received via incoupler 210, scanned along the axis 302, directed into an exit pupil expander 304, and then routed to the outcoupler 214 to be output from the waveguide 212 (e.g., toward the eye of the user). In some embodiments, the exit pupil expander 304 expands one or more dimensions of the eyebox of an HMD that includes the laser projection system 200 (e.g., with respect to what the dimensions of the eyebox of the HMD would be without the exit pupil expander 304). In some embodiments, the incoupler 210 and the exit pupil expander 304 each include respective one-dimensional diffraction gratings (i.e., diffraction gratings that extend along one dimension). It should be understood that FIG. 3 shows a substantially ideal case in which incoupler 210 directs light straight down (with respect to the presently illustrated view) in a first direction that is perpendicular to the scanning axis 302, and the exit pupil expander 304 directs light to the right (with respect to the presently illustrated view) in a second direction that is perpendicular to the first direction. While not shown in the present example, it should be understood that, in some embodiments, the first direction in which the incoupler 210 directs light is slightly or substantially diagonal, rather than exactly perpendicular, with respect to the scanning axis 302.

Also shown in FIG. 3 is a cross-section 306 of incoupler 210 illustrating features of the grating that can be configured to tune the efficiency of incoupler 210. The period p of the grating is shown having two regions, with transmittances t1=1 and t2=0 and widths d1 and d2, respectively. The grating period is constant p=d1+d2, but the relative widths d1, d2 of the two regions may vary. A fill factor parameter x can be defined such that d1=xp and d2=(1−x)p. In addition, while the profile shape of the grating features in cross-section 306 is generally shown as being square or rectangular with a height h, the shape can be modified based on the wavelength of light that incoupler 210 is intended to receive. For example, in some embodiments, the shape of the grating features is triangular, rather than square, to create a more "saw-toothed" profile. In some embodiments, incoupler 210 is configured as a grating with a constant period but different fill factors, heights, and slant angles based on the desired efficiency of the respective incoupler 210 or the desired efficiency of a region of the respective incoupler 210.

Figure 4:
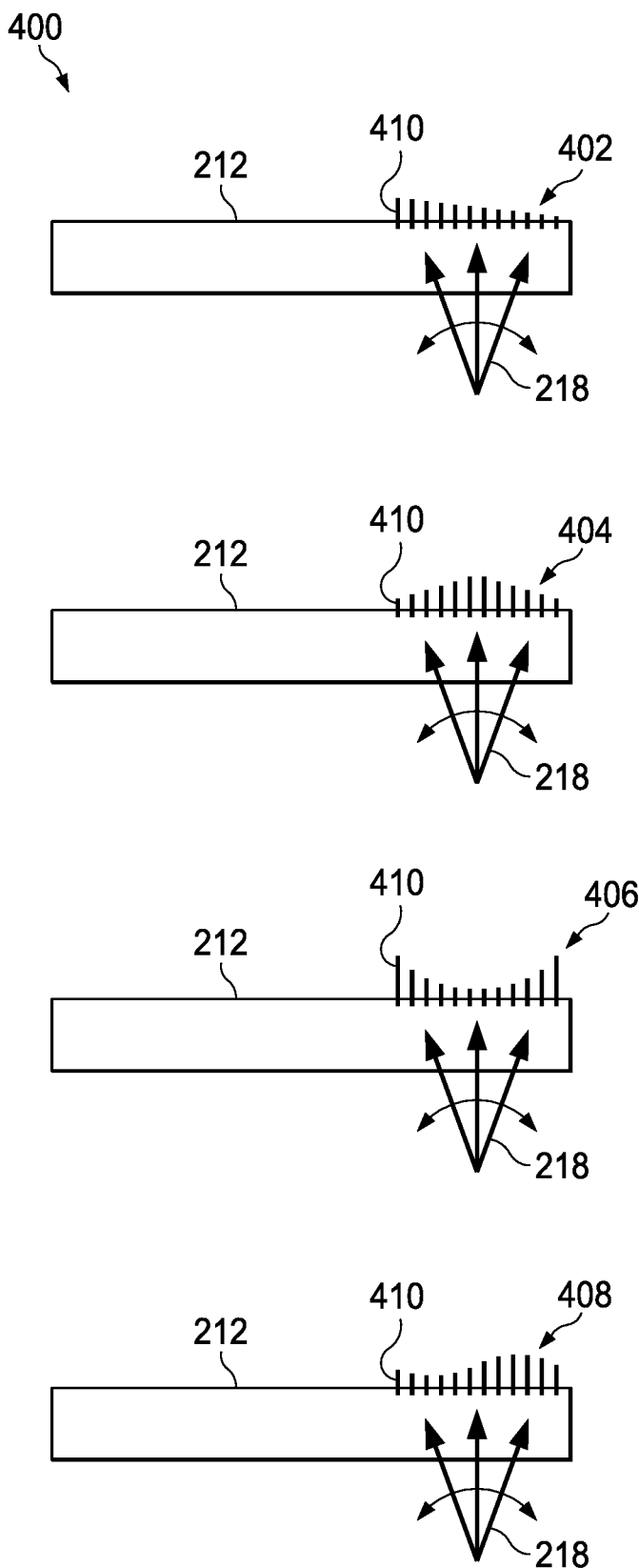
FIG. 4 illustrates a cross-section view of example incouplers having varied grating features to achieve a uniform or tailored incoupling efficiency in a laser projection system, such as the laser projection system of FIG. 2, in accordance with some embodiments.

FIG. 4 illustrates a cross-section view 400 of example incouplers 402-402 having varied grating features 410 to achieve a uniform or tailored incoupling efficiency depending on design considerations. While FIG. 4 illustrates varied grating features 410 for diffractive gratings, other types of gratings can also be varied in a similar manner, for example, slanted gratings, holographic gratings, and blaze gratings can be varied to account for input light 218 being provided to an incoupler of the waveguide 212 at different angles. Typical grating parameters that can be varied along the incoupler include, for example, feature height, feature spacing, feature angles, feature density, etc. For example, in some embodiments, the grating features 410 are varied linearly, in a continuous manner, with the height of the features 410 consistently increasing along the length of the incoupler, as shown by incoupler 402. In some embodiments, the grating features are varied in an upside-down V shape, with the height of the features 410 at the outer edges of the incoupler being shorter than the height of the features towards the middle of the incoupler, as shown by incoupler 404. In some embodiments, the grating features are varied in a U shape with the height of the features at the outer edges being taller than the height of the features towards the middle of the incoupler, as shown by incoupler 406. In other embodiments, the grating features are varied asymmetrically such that some of the features are taller than other features in a non-linear pattern along the length of the incoupler, as shown by incoupler 408. While different grating feature 410 heights are shown in the example incouplers 402-408, it will be appreciated that any of the grating features' spacing, angles, and/or density can be varied linearly, in an upside-down V shape, in a U shape, or asymmetrically along the length of the incoupler in addition to, or instead of, varying the height of the grating feature.

Figure 5:
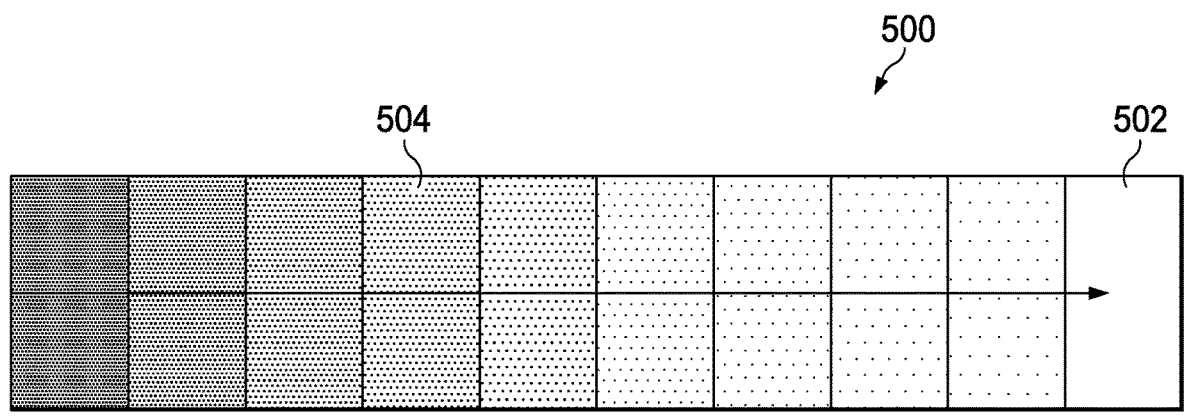
FIG. 5 shows a block diagram of an example incoupler with varied grating features separated into discrete zones along one dimension of the incoupler, in accordance with some embodiments.

FIG. 5 illustrates a block diagram 500 of an example incoupler 510 with varied grating features separated into discrete zones along one dimension of the incoupler 510 such that feature parameters are varied over the incoupler 510 but remain constant within a given zone. For example, the feature height, feature spacing, feature angles, and feature density are uniform within zone 502 and tuned to achieve maximum incoupling efficiency of light incident on zone 502, whereas, in zone 504, at least one of the feature height, feature spacing, feature angles, and/or feature density is different from that in zone 502 in order to provide reduced incoupling efficiency of light incident on zone 504. Configuring different zones of incoupler 510 to have different incoupling efficiencies can help reduce inconsistencies in the color and intensity (i.e, brightness) of the images projected from a projection system, such as the laser projection system 200 of FIG. 2. For example, light that is incident on zone 502 may be incident at an angle that results in light being reflected via TIR back towards the incoupler 510 and interacting with the incoupler 510 a second time after being transmitted into a waveguide, such as waveguide 212 of FIG. 2. This is generally referred to as "double bounce" and the effect is light lost from the system as the light that is incident on the incoupler 510 for a second time is transmitted out of the waveguide 512, resulting in less light coupled into the waveguide 212 at zone 502 reaching the user's eye and, thus, reducing the brightness of portions of an image viewed by the user. In order to compensate for the light lost via double bounce at zone 502, zone 502 is configured to provide maximum incoupling efficiency while the other zones, such as zone 504, are configured to have reduced efficiency because, due to their position along the incoupler, there is less likelihood of double bounce affecting the light incoupled at these other zones of the incoupler 510. Thus, varying the incoupling efficiency along incoupler 510 by varying certain grating feature parameters results in a uniform amount of light being transmitted by the waveguide 212 and projected at the FOV 106 such that the user views an image having consistent brightness and color.

Figure 6:
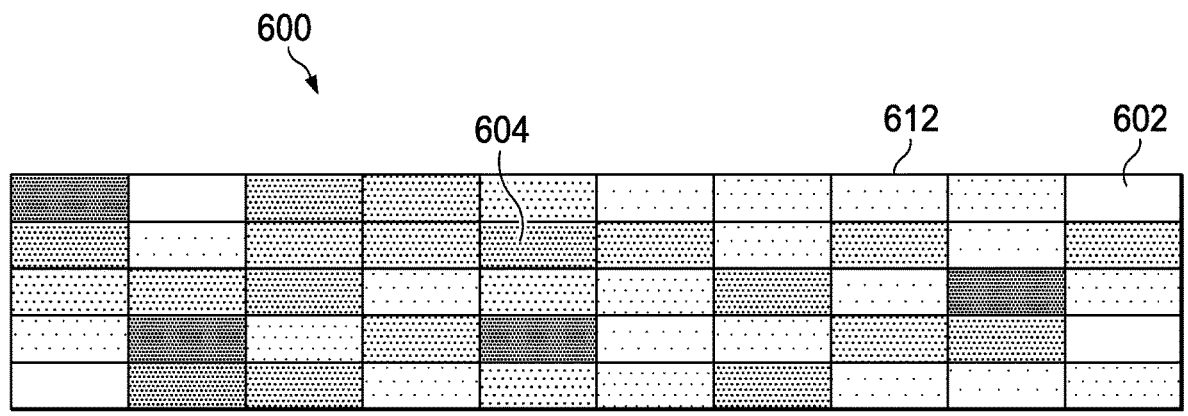
FIG. 6 shows a block diagram of an example incoupler with varied grating features in discrete zones within multiple dimensions of the incoupler, in accordance with some embodiments.

FIG. 6 illustrates a block diagram 600 of an incoupler 612 with varied grating features in discrete zones within multiple dimensions of the incoupler 612. Thus, rather than only varying the grating features in a single dimension, as illustrated in FIG. 5, in some embodiments, the grating features are varied in distinct zones along multiple dimensions of the incoupler 612 (i.e., in a grid). For example, in zone 602, the feature height, feature spacing, feature angles, and feature density are uniform within zone 602 and tuned to achieve maximum incoupling efficiency of light incident on zone 602, whereas, in zone 604, at least one of the feature height, feature spacing, feature angles, and/or feature density is different from that in zone 602 in order to provide reduced incoupling efficiency of light incident on zone 604. Similar to varying the incoupling efficiency along incoupler 510, varying the incoupling efficiency of the zones of incoupler 612 contributes to uniform brightness and color of the image projected at a FOV, such as FOV 106 of FIG. 1.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A system comprising:
   an optical scanner;
   an optical engine configured to provide light to the optical scanner; and
   a waveguide comprising an incoupler configured to receive light from the optical scanner, wherein the incoupler comprises:
     a plurality of features having a uniform period and varying in at least one selected from a group of spacing, angle, fill factor, and density;
     a first zone having a first incoupling efficiency and including a first set of the plurality of features having a first uniform value for the at least one at least one selected from the group of spacing, angle, fill factor, and density; and
     a second zone having a second incoupling efficiency and including a second set of the plurality of features having a second uniform value for the at least one selected from the group of spacing, angle, fill factor, and density;
   wherein the first uniform value differs from the second uniform value; and
   wherein the first incoupling efficiency is greater than the second incoupling efficiency.

2. The system of claim 1, wherein the first zone and the second zone are positioned in a grid along two dimensions of the incoupler.

3. The system of claim 1, wherein the plurality of features are varied continuously along a length of the incoupler.

4. The system of claim 3, wherein the plurality of features are varied in a U shape along the length of the incoupler.

5. The system of claim 3, wherein the plurality of features are varied in an upside-down V shape along the length of the incoupler.

6. The system of claim 1, wherein the first zone is configured to direct at least a portion of the light into a body of the waveguide such that a reflection of the at least a portion of the light is received by the first zone from the body of the waveguide.

7. The system of claim 1, wherein the first zone includes one or more grating features having a triangular shape.

8. A head-mounted display (HMD) system comprising:
a lens element supported by a support structure, the lens element comprising a waveguide having an incoupler configured to receive light from an optical scanner of the HMD, wherein the incoupler comprises:
  a plurality of features having a uniform period and varying in at least one selected from a group of spacing, angle, fill factor, and density;
  a first zone having a first incoupling efficiency and including a first set of the plurality of features having a first uniform value for the at least one selected from the group of spacing, angle, fill factor, and density; and
  a second zone having a second incoupling efficiency and including a second set of the plurality of features having a second uniform value for the at least one selected from the group of spacing, angle, fill factor, and density;
wherein the first uniform value differs from the second uniform value; and
wherein the first incoupling efficiency is greater than the second incoupling efficiency.

9. The HMD of claim 8, wherein the first zone and the second zone are positioned in a grid along two dimensions of the incoupler.

10. The HMD of claim 8, wherein the plurality of features are varied continuously along a length of the incoupler.

11. The HMD of claim 10, wherein the plurality of features are varied in a U shape along the length of the incoupler.

12. The HMD of claim 10, wherein the plurality of features are varied in an upside-down V shape along the length of the incoupler.

13. The HMD of claim 8, wherein the first zone is configured to direct at least a portion of the light into a body of the waveguide such that a reflection of the at least a portion of the light is received by the first zone from the body of the waveguide.

14. The HMD of claim 8, wherein the first zone includes one or more grating features having a rectangular shape.

15. A method comprising:
varying an incoupling efficiency of an incoupler of a waveguide by varying at least one selected from a group of spacing, angle, fill factor, and density of a plurality of surface features forming the incoupler, wherein the incoupler comprises:
  a first zone having a first incoupling efficiency and including a first set of the plurality of surface features having a period and a first uniform value for the at least one selected from the group of spacing, angle, fill factor, and density and having a first incoupling efficiency; and
  a second zone having a second incoupling efficient and including a second set of the plurality of surface features having the period and a second uniform value for the at least one selected from the group of spacing, angle, fill factor, and density and having a second incoupling efficiency;
wherein the first uniform value differs from the second uniform value; and
wherein the first incoupling efficiency is greater than the second incoupling efficiency.

16. The method of claim 15, wherein the first zone and the second zone are positioned in a grid along two dimensions of the incoupler.

17. The method of claim 15, wherein the plurality of surface features are varied continuously along a length of the incoupler.

18. The method of claim 15, wherein the plurality of surface features are varied in a U shape along a length of the incoupler.

19. The method of claim 15, the first zone is configured to direct at least a portion of received light into a body of a waveguide such that a reflection of the at least a portion of received light is received by the first zone from the body of the waveguide.

20. The method of claim 15, wherein the first zone includes one or more grating features having a triangular shape.

* * * * *